United States Patent [19]

Schenck et al.

[11] Patent Number: 4,495,327
[45] Date of Patent: Jan. 22, 1985

[54] AQUEOUS CATIONIC SURFACE-COATING SYSTEM AND ITS USE

[75] Inventors: Hans-Uwe Schenck, Wachenheim; Rainer Blum, Ludwigshafen; Erich Gulbins, Heidelberg; Fritz-Erdmann Kempter, Feldafing; Eberhard Schupp, Schwetzingen, all of Fed. Rep. of Germany

[73] Assignee: BASF Aktiengesellschaft, Fed. Rep. of Germany

[21] Appl. No.: 515,026

[22] Filed: Jul. 18, 1983

Related U.S. Application Data

[63] Continuation-in-part of Ser. No. 371,012, Apr. 22, 1982, abandoned.

[30] Foreign Application Priority Data

May 9, 1981 [DE] Fed. Rep. of Germany ....... 3118418

[51] Int. Cl.$^3$ ............. C09D 3/80; C09D 5/40
[52] U.S. Cl. ................. 524/556; 204/181 C; 524/560; 524/563; 524/901
[58] Field of Search ............ 524/556, 560, 563, 901; 204/181 C

[56] References Cited

U.S. PATENT DOCUMENTS

| | | | |
|---|---|---|---|
| 3,033,844 | 5/1962 | Peters et al. | 260/DIG. 25 |
| 3,088,940 | 5/1963 | Jenkins | 260/DIG. 25 |
| 3,089,866 | 5/1963 | Crawford | 260/DIG. 25 |
| 3,682,814 | 8/1972 | Gilchrist | 204/181 C |
| 4,017,438 | 4/1977 | Jerabek et al. | 204/181 C |
| 4,036,795 | 7/1977 | Tominaga | 204/181 C |
| 4,139,396 | 2/1979 | Otsuki et al. | 106/243 |
| 4,147,676 | 4/1979 | Pampouchidis | 204/181 C |
| 4,251,414 | 2/1981 | Nakada et al. | 204/181 R |
| 4,251,415 | 2/1981 | Nakada et al. | 525/111 |
| 4,310,646 | 1/1982 | Kempter et al. | 204/181 C |
| 4,331,575 | 5/1982 | Feldman et al. | 260/DIG. 25 |
| 4,358,551 | 11/1982 | Shimp | 524/901 |
| 4,395,528 | 7/1983 | Leiner et al. | 204/181 C |

FOREIGN PATENT DOCUMENTS

| | | |
|---|---|---|
| 2057799 | 7/1971 | Fed. Rep. of Germany . |
| 2320301 | 4/1975 | Fed. Rep. of Germany . |
| 2541234 | 4/1976 | Fed. Rep. of Germany . |
| 2707482 | 1/1978 | Fed. Rep. of Germany . |
| 2734413 | 5/1978 | Fed. Rep. of Germany . |
| 2749776 | 5/1978 | Fed. Rep. of Germany . |
| 2926001 | 1/1980 | Fed. Rep. of Germany . |
| 2942488 | 4/1981 | Fed. Rep. of Germany . |
| 3021300 | 12/1981 | Fed. Rep. of Germany . |
| 3026823 | 2/1982 | Fed. Rep. of Germany . |
| 53-142444 | 12/1978 | Japan . |
| 1303480 | 1/1973 | United Kingdom . |
| 1551509 | 8/1979 | United Kingdom . |

*Primary Examiner*—Ronald W. Griffin
*Attorney, Agent, or Firm*—Keil & Weinkauf

[57] ABSTRACT

An aqueous cationic surface-coating system contains an olefinically unsaturated surface-coating binder having basic nitrogen groups, some or all of which are converted into salts with acid, a Co, Mn, Pb, Ce, Zr, Ca, Zn, Fe, Al, Cu, Ni or Cd complex, if appropriate in combination with an inhibitor and/or an initiator which supplies free radicals.

This surface-coating system can be used for cathodic electrocoating or for conventional methods of surface-coating.

4 Claims, No Drawings

AQUEOUS CATIONIC SURFACE-COATING SYSTEM AND ITS USE

This application is a continuation-in-part of copending U.S. Ser. No. 371,012, filed Apr. 22, 1982, now abandoned.

The present invention relates to an aqueous cationic surface-coating system and its use, in particular for cathodic electrocoating of metal surfaces.

Electrocoating with coating compositions which can be deposited anodically has been known for a long time. Cathodic electrocoating has recently proved to be particularly advantageous. The available crosslinking possibilities are, however limited, since most conventional crosslinking systems are acid-catalyzed and a film deposited on the cathode is strongly basic.

A reaction suitable for crosslinking cathodically deposited surface-coating films is urethane formation from blocked isocyanate groups and hydroxyl groups, such as is disclosed, for example, in German Laid-Open application DOS No. 2,057,799. The reaction products of Mannich bases nd epoxide resins such as are disclosed, for example, in German Laid-Open application DOS No. 2,320,301 provide another possible method of crosslinking.

Another type of binder suitable for cathodic electrocoating undergoes crosslinking via C-C double bonds. This type of crosslinking is advantageous because, in comparison with the above binders, there is less tendency for low molecular weight constituents to be split off during baking.

Thus, German Laid-Open application DOS Nos. 2,749,776 and DOS 2,707,482 discloses synthetic resins for cataphoresis which contain $\alpha,\beta$-unsaturated carboxylic acid ester groups as crosslinking centers. German patent application Nos. P 29 42 488.2, P 30 21 300.4 and P 30 26 823.6 propose binders, which can be used for the preparation of cathodic coating compositions containing basic groups and also $\alpha,\beta$-unsaturated amidomethyl groups. These binders are obtained by reacting monophenols and/or polyphenols carrying $\alpha,\beta$-unsaturated amidomethyl groups, polyepoxide compounds and amines or amine salts, and can also be used in combination with polydiene oils.

German Laid Open application DOS Nos. 2,926,001 and DOS 2,734,413 also disclose cationic surface-coating systems based on polymers of conjugated dienes which are wholly or partly crosslinked by double bonds.

To achieve adequate crosslinking, the above systems crosslinked via double bonds must be baked at relatively high temperatures, for example at 180° C. for about 30 minutes, in the same way as other known classes of cathodic electrocoating compositions. However, systems which are adequately crosslinked within only 20 to 30 minutes of baking at significantly lower temperatures must be developed, because of the substantially increased energy costs.

German Laid-Open application DOS Nos. 2,926,001 and DOS 2,734,413 disclose the addition of oil-soluble metal salts of organic acids and transition metals to accelerate an oxidizing and crosslinking effect on the unsaturated groups in the diene polymers used in these DOS's. However, as will be shown with the aid of Comparative Examples in the text which follows, the siccative action of these compounds not only accelerates the baking operation but also produces a rougher film surface, because of the crosslinking characteristics, and has an adverse effect on the stability of the electrocoating bath.

The same applies to the addition of metal salts disclosed in German Laid-Open application DOS No. 2,541,234.

It is an object of the present invention to provide aqueous cationic surface-coating systems in which crosslinking during baking is greatly accelerated, so that the baking temperatures can be drastically reduced without at the same time adversely affecting the smoothness of the films formed or the shelf life of the aqueous electrocoating compositions.

Surprisingly, we have found that this object is achieved by metal complexes. The desired effect can be assisted by adding initiators which supply free radicals, or organic compounds which donate oxygen.

The present invention relates to an aqueous cationic surface-coating system containing an olefinically unsaturated surface-coating binder with basic nitrogen groups, some or all of which are converted into salts with acid, and, where relevant, other conventional auxiliaries and additives, which surface-coating system contains from 1 ppm to 1% (metal content, based on the binder) of a Co, Mn, Pb, Ce, Zr, Ca, Zn, Fe, Al, Cu, Ni or Cd complex, if appropriate in combination with an inhibitor and/or an initiator which supplies free radicals.

Preferred suitable olefinically unsaturated surface-coating binders having basic nitrogen groups are those with $\alpha,\beta$-olefinically unsaturated amidomethyl groups and/or $\alpha,\beta$-olefinically unsaturated carboxylic acid ester groups and/or products derived from a diene polymer.

The present invention also relates to the use of the aqueous cationic surface-coating system according to the invention for cathodic electrocoating of metal surfaces and for conventional methods of surface-coating, such as spraying, dipping or flow-coating.

The aqueous cationic surface-coating system according to the invention has a long shelf life and gives films with a very smooth surface even at low temperatures or after a short baking period.

The statements which follow relate to the components which make up the aqueous cationic surface-coating system according to the invention.

Suitable olefinically unsaturated surface-coating binders having basic nitrogen groups, some or all of which are converted into salts with acid, include a large number of binders which, in addition to basic nitrogen groups, which are converted into the corresponding salts by addition of acid, carry olefinic double bonds having a crosslinking action, and in which these double bonds can either be electron-deficient and activated by conjugation with C-heteroatom double bond, or can be isolated or conjugated with another C—C double bond and contain more electrons than the former type. Examples of these types of binders include homopolymers of conjugated dienes, such as butadiene, isoprene and the like, and/or copolymers of such conjugated dienes with other vinyl monomers, such as styrene, (meth)acrylates and the like, which are obtained by either ionic or free radical homopolymerization or copolymerization and are modified by the incorporation of basic nitrogen groupings.

Another suitable class of binders contain activated C—C double bonds, for example those which are conjugated with a carbonyl group.

Binders which contain both electron-deficient, activated double bonds and electron-rich double bonds are also suitable for the compositions according to the invention. Combinations of binders in which one carries an activated double bond and the other carries an electron-rich double bond can likewise be used.

In addition to the double bonds having a cross-linking action, either the binders themselves can also contain other groups having a crosslinking action, e.g. Mannich base groups resulting from the reaction of a phenolic compound with formaldehyde and a secondary amine and/or methylol groups and/or methylol ether groups and/or blocked isocyanate groups, or the binders which carry the C—C double bonds having a crosslinking action can be mixed with other resins, such as completely blocked polyisocyanates, acrylate resins, epoxide resins, polyesters, alkyd resins or hydrocarbon resins.

Particularly suitable olefinically unsaturated surface-coating binders having a crosslinking action and cationic groupings based on basic nitrogen groups are those containing α,β-olefinically unsaturated amidomethyl groups, or α,β-olefinically unsaturated carboxylic acid ester groups, and products derived from diene polymers, such as those described, for example, in P 29 42 488.2, P 30 21 300.4, P 30 26 823.6, German Laid-Open application DOS Nos. 2,557,562, DOS 2,636,797, DOS 2,753,861, DOS 2,755,538, DOS 2,732,902, DOS 2,732,955, DOS 2,836,830 and DOS 2,832,937, European patent application No. 0,012,963, German Laid-Open application DOS Nos. 2,707,482, DOS 2,707,405, DOS 2,749,776, DOS 2,801,523 and DOS 2,752,255, British Pat. No. 2,008,125 and German Laid-Open application DOS. Nos. 3,000,911, DOS 2,732,736, DOS 2,728,470, DOS 2,926,001, DOS 2,934,172, DOS 2,943,879, DOS 2,616,591, DOS 2,754,733, DOS 2,734,413, DOS 2,944,082, DOS 2,924,343, DOS 2,828,014, DOS 2,911,243, DOS 2,911,242 and DOS 2,833,786.

The binder generally contains from 0.05 to 10, preferably from 0.01 to 2, % by weight, based on the binder (solid), of basic nitrogen capable of salt formation, and its content of olefinic double bonds is generally high enough to give an iodine number of from 5 to 500, preferably from 20 to 400.

Suitable metal complexes are those of Co, Mn, Pb Ce, Zr, Ca, Zn, Fe, Al, Cu, Ni and Cd, and of mixtures of these metals. Co, Mn, Fe, Pb, Ce, Zr, Cu and Ni are preferred.

Examples of complex ligands which may be used are diacetyl dioxime, cyclohexanone oxime, acetylacetonesalicylaldehyde, methyl ethyl ketoxime, α-benzoin oxime, cyclohexanedione dioxime, salicylaldoxime, ethylenediaminetetraacetic acid, nitrilotriacetic acid, α-aminoacids, e.g. glycine and alanine, 8-hydroxyquinoline, the bis-aldimine of salicylaldehyde with ethylenediamine, aminoguanidine, biguanide, polyamines, o-aminophenol, Mannich bases of amines and polyamines and mononuclear and polynuclear phenols. The complexes are generally formed from the metal ions and molecules or ions with one or several ligand functions, and the complex ligand functions participating in the complexing can be, for example, R-NH$_2$, where R is H, alkyl or aryl, R-OH, i.e. alcohols and phenols,

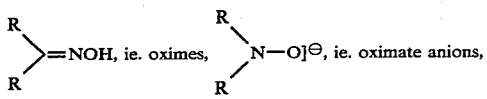

R-SH, i.e. mercaptans, R-S-R, i.e. thioethers, R-COO$^\ominus$, i.e. carboxylates, R-O-R i.e. ethers

i.e. ketones and aldehydes,

i.e. aldimines and ketimines, and combinations thereof. The complexes can be neutral, cation or anion complexes.

Complexes of the above metals and ligands with which chelate complexes are formed are preferred.

The surface-coating system according to the invention contains from 1 ppm to 1% by weight, preferably from 5 ppm to 5,000 ppm (metal content, based on the binder), of metal complexes.

The metal complexes according to the invention can be incorporated into the cationic surface-coating system by various methods. Thus, the already formed metal complex can be dispersed or dissolved as a solid or as a solution in the binder and, after further surface-coating additives, e.g. pigments and fillers, have been incorporated, can be dispersed or dissolved in this form in the aqueous electrocoating bath; alternatively, the already formed metal complexes can be dissolved or dispersed in the aqueous electrocoating bath in solid form or as a solution, separately from the binder. In another method, metal ions in the form of their salts and the organic compounds used as complex ligands are incorporated separately into the binder or the aqueous electrocoating bath, so that the metal complexes are formed in situ.

Where appropriate, the metal complexes can be combined with inhibitors and/or initiators which supply free radicals or split off oxygen.

Examples of suitable compounds which supply oxygen and/or free radicals under the influence of the metal complexes used according to the invention and can assist in crosslinking are organic peroxides, peroxide dicarbonates, alkyl peresters, perketals and hydroperoxides, such as cumene hydroperoxide, pinane hydroperoxide, dicumyl peroxide, benzoyl peroxide and di-t-butyl peroxide.

The initiators and inhibitors can be incorporated into the binder itself before preparation of the aqueous cationic surface-coating systems, or they can be added to the aqueous surface-coating system, e.g. the electrocoating bath, separately.

The binders or binder mixtures in the compositions according to the invention are water-soluble or water-dispersible and can be deposited cataphoretically. In addition to the binders and to the metal complexes, inhibitors and initiators according to the invention, they can contain the customary auxiliaries and additives used in surface-coating, such as pigments, fillers, leveling agents, coalescing solvents (as defined in German Laid-Open application DOS No. 2,934,467), plasticizers, and other crosslinking catalysts which act on the groups having a crosslinking action which are present in the binder in addition to the C—C double bonds, for example blocked acids, such as are disclosed for example, in German Laid-Open application DOS No. 2,658,812.

The cationic surface-coating systems according to the invention generally contain from 95 to 40, preferably from 90 to 60, % by weight of water and can be applied to the substrate to be coated or finished, for example to wood, metal, glass or ceramic, by a conventional surface-coating method, such as spraying, immersing or flow-coating, and can be dried, and hardened at above 130° C. The compositions thereby obtained are, for example, very smooth, hard and resistant to solvents. A surface-coating binder according to the invention which has been protonated with an acid, e.g. phosphoric acid or a derivative thereof, but preferably with a water-soluble carboxylic acid such as acetic acid, formic acid or lactic acid, is preferably used. The protonated surface-coating binder can be diluted with water and can be processed by the above conventional surface-coating methods to give coatings with particularly useful properties.

Protonated surface-coating binders are preferably used for cathodic electrocoating of electrically conducting surfaces, for example of metal components, sheets and the like made of brass, copper, aluminum, iron or steel, which, if appropriate, have been pretreated chemically, for example phosphated.

For cathodic electrocoating, the solids content of the electrocoating bath is generally brought to 5–30% by weight by dilution with demineralized water. Coating is generally effected at from 15° to 40° C. over a period of from 1 to 3 minutes and at a bath pH of from 4.0 to 8.5, preferably from 5.5 to 7.5, under a coating voltage of from 50 to 500 V. After the film cathodically deposited on the electrically conducting surface has been rinsed, it is hardened at above 130° C., preferably at from 140° to 170° C., for about 20 minutes.

In the Examples which follow and which illustrate the invention, without restricting it thereto, parts and percentages are by weight.

BINDER A

A binder containing

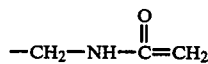

groups was prepared according to Example 4 of German patent application No. P 30 21 300.4.

BINDER B

A binder containing

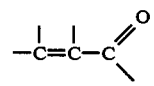

groups was prepared according to Example 5 of German Laid-Open application DOS No. 2,707,482.

BINDER C

A binder based on a modified polybutadiene oil was prepared according to Example 5 of German Laid-Open application DOS No. 2,734,413.

COMPARATIVE EXAMPLE A1

Binder A was converted into a 10% strength aqueous electrocoating composition as described in German patent application No. P 30 21 300.4, non-pretreated steel connected as the cathode and a zinc-phosphatized steel sheet were electrocoated with this composition and it was baked at graduated baking temperatures. The properties of the resulting film were examined, and are summarized, together with the coating conditions, in Table 1.

COMPARITIVE EXAMPLE A2

The procedure followed was as in Comparative Example A1, but a siccative metal salt alone was additionally used. The salt was first homogeneously dispersed in the binder solution, before this solution was converted into an aqueous electrocoating composition. The type and amount of additive can be seen from Table 1.

EXAMPLE 1

The procedure followed was as in Comparative Example A1, but a combination, according to the invention, of a metal complex according to the invention was used. The additional component was first homogeneously dispersed in the binder solution, before this solution was converted into an aqueous electro-coating composition. The type and amount of the additive used can be seen from Table 1.

COMPARATIVE EXAMPLE B1

Binder B was converted into a 10% strength electrocoating composition as described in German Laid-Open application DOS No. 2,707,482 (Example 5), and this was deposited on a steel sheet connected as the cathode and baked at graduated baking temperatures. The properties of the resulting film were examined, and are summarized, together with the coating conditions, in Table 2.

COMPARATIVE EXAMPLE B2

The procedure followed was as described in Comparative Example B1, but a siccative metal salt alone was additionally used. The salt was first homogeneously dispersed in the binder solution, before this solution was converted into an aqueous electrocoating composition. The type and amount of additive can be seen from Table 2.

EXAMPLE 2

The procedure followed was as described in Comparative Example B 1, but a metal complex according to the invention was used. The additional component was first homogeneously dispersed in the binder solution, before this solution was converted into an aqueous electrocoating composition. The type and amount of each additive used can be seen from Table 2.

COMPARATIVE EXAMPLE C1

Binder C was converted into a 12% strength aqueous electrocoating composition as described in German Laid-Open application DOS No. 2,743,413, and this was deposited cathodically on a zinc-phosphatized steel sheet and baked at graduated baking temperatures. The properties of the resulting film were examined, and are summarized together with the coating conditions in Table 3.

COMPARATIVE EXAMPLE C2

The procedure followed was as described in Comparative Example C1, but a siccative metal salt alone was additionally used. The salt was first homogeneously dispersed in the binder solution, before this solution was converted into an aqueous electrocoating composition. The type and amount of additive can be seen from Table 3.

EXAMPLES 3 AND 4

The procedure followed was as described in Comparative Example C1, but a combination, according to the invention, of metal compound and inhibitor or a metal complex according to the invention was additionally used. The additional component was first homogeneously dispersed in the binder solution, before this solution was converted into an aqueous electrocoating composition. The type and amount of each additive used can be seen from Table 3.

TESTING OF THE COMPOSITIONS (1) Konig pendulum hardness according to DIN 53,157 (seconds)

(2) Erichsen deep-drawing value according to DIN 53,156 (mm)

(3) Acetone resistance as a measure of the crosslinking: a cotton pad impregnated with acetone was vigorously rubbed back and forth 20 times over an area of 5 cm$^2$. The appearance of the test area was evaluated according to the following scale:
 0: no change at all
 1: slightly matt
 2: matt, but only superficial attack
 3: severe attack
 4: coating dissolved offdown to the substrate (4) The smoothness of the surface was evaluated visually:
 0: good
 1: slightly structured
 2: somewhat rough
 3: matt, severely structured (5) The baked films were scored and were subjected to the ASTM salt-spraying test (DIN SS 50,021). After 14 days, the migration under the surface-coating from the scoring was measured and determined on one side.

TABLE 1

| Example No. | Type of binder | Initiator Type | Initiator Amount (%), based on the resin | Inhibitor Type | Inhibitor Amount (%), based on the resin | Metal compound Type | Metal compound Amount (%), based on the resin | Coating Substrate | Coating Volt | Coating thickness ($\mu$m) | Hardening temperature (30 minutes) (°C.) |
|---|---|---|---|---|---|---|---|---|---|---|---|
| Comparative Example A1 | A | — | — | — | — | — | — | Steel sheet | 90 | 16 | 140 |
| | | | | | | | | | | 17 | 160 |
| | | | | | | | | | | 16 | 180 |
| | | | | | | | | Zinc phosphatized steel sheet | 170 | 17 | 140 |
| | | | | | | | | | | 18 | 160 |
| | | | | | | | | | | 17 | 180 |
| Comparative Example A2 | A | — | — | — | — | Cobalt naphthenate | 0.048 (calculated as Co metal) | Steel sheet | 80 | 19 | 140 |
| | | | | | | | | | | 17 | 160 |
| | | | | | | | | | | 18 | 180 |
| | | | | | | | | Zinc phosphatized steel sheet | 180 | 18 | 140 |
| | | | | | | | | | | 20 | 160 |
| | | | | | | | | | | 19 | 180 |
| 1 | A | — | — | — | — | Cobalt salicylaldehyde complex | 0.048 (calculated as Co metal) | Steel sheet | 80 | 17 | 140 |
| | | | | | | | | | | 16 | 160 |
| | | | | | | | | | | 18 | 180 |
| | | | | | | | | Zinc phosphatized steel sheet | 180 | 17 | 140 |
| | | | | | | | | | | 19 | 160 |
| | | | | | | | | | | 18 | 180 |

| Example No. | Hardness[1] | Deep-drawing Value[2] | Acetone Resistance[3] | Surface[4] | Corrosion Resistance[5] |
|---|---|---|---|---|---|
| Comparative Example A1 | 122 | 0.7 | 4 | 1 | >20 |
| | 136 | 21.4 | 4 | 1 | >20 |
| | 190 | 6.4 | 2 | 1 | 2–3 |
| | 130 | 0.4 | 4 | 1 | >20 |
| | 152 | 1.2 | 4 | 1 | >20 |
| | 192 | 6.0 | 2 | 1 | 1–2 |
| Comparative Example A2 | 165 | 1.2 | 2 | 3 | 8–12 |
| | 190 | 6.0 | 0 | 3 | 2–3 |
| | 192 | 6.0 | 0 | 2 | 2–3 |
| | 160 | 1.5 | 2 | 3 | 6–7 |
| | 191 | 5.9 | 0 | 3 | 1–2 |
| | 194 | 6.0 | 0 | 2 | 1–2 |
| 1 | 162 | 5.1 | 0 | 0 | 5–6 |
| | 190 | 6.2 | 0 | 0 | 2–4 |
| | 201 | 6.0 | 0 | 0 | 1–3 |
| | 165 | 4.7 | 0 | 0 | 5–8 |
| | 196 | 6.0 | 0 | 0 | 1–2 |
| | 198 | 6.2 | 0 | 0 | 1–2 |

TABLE 2

| Example No. | Type of Binder | Inhibitor Type | Inhibitor Amount (%), based on the resin | Metal compound Type | Metal compound Amount (%), based on the resin | Substrate | Volt | Coating thickness [μm] | Hardening temperature (30 minutes) [°C.] |
|---|---|---|---|---|---|---|---|---|---|
| Comparative Example B1 | B | — | — | — | — | Steel sheet | 280 | 16 | 140 |
|  |  |  |  |  |  |  |  | 17 | 160 |
|  |  |  |  |  |  |  |  | 16 | 180 |
|  |  |  |  |  |  |  |  | 17–18 | 200 |
| Comparative Example B2 | B | — | — | Cobalt naphthenate | 720 (calculated as Co metal) | Steel sheet | 280 | 16–17 | 140 |
|  |  |  |  |  |  |  |  | 16 | 160 |
|  |  |  |  |  |  |  |  | 16 | 180 |
|  |  |  |  |  |  |  |  | 17 | 200 |
| 2 | B | — | — | Cobalt salicylaldehyde complex | 720 (calculated as Co metal) | Steel sheet | 280 | 17 | 140 |
|  |  |  |  |  |  |  |  | 18 | 160 |
|  |  |  |  |  |  |  |  | 17 | 180 |
|  |  |  |  |  |  |  |  | 17–18 | 200 |

| Example No. | Hardness[1] | Deep-drawing Value[2] | Acetone Resistance[3] | Surface[4] | Corrosion Resistance[5] |
|---|---|---|---|---|---|
| Comparative Example B1 | n.d. | n.d. | 4 | 1 | >20 |
|  | n.d. | n.d. | 4 | 1 | >20 |
|  | 210 | 6.8 | 3 | 1 | 4–5 |
|  | 205 | 7.0 | 3 | 1 | 2–3 |
| Comparative Example B2 | n.d. | n.d. | 4 | 2 | >20 |
|  | 196 | 6.9 | 2 | 3 | 2–3 |
|  | 210 | 6.8 | 2 | 3 | 2 |
|  | 206 | 7.2 | 0 | 3 | 2 |
| 2 | n.d. | n.d. | 4 | 2 | >20 |
|  | 203 | 7.2 | 1 | 1 | 2–3 |
|  | 211 | 7.0 | 0 | 1 | 1–2 |
|  | 208 | 7.3 | 0 | 1 | 1–2 | n.d. = not determined, since the film was sticky and not sufficiently crosslinked

TABLE 3

| Example No. | Type of Binder | Inhibitor Type | Inhibitor Amount (%), based on the resin | Metal compound Type | Metal compound Amount (%), based on the resin | Substrate | Volt | Coating thickness [μm] | Hardening temperature (30 minutes) [°C.] |
|---|---|---|---|---|---|---|---|---|---|
| Comparative Example C1 | C | — | — | — | — | Zinc phosphatized steel sheet | 140 | 19 | 180 |
|  |  |  |  |  |  |  |  | 20 | 200 |
|  |  |  |  |  |  |  |  | 18 | 220 |
| Comparative Example C2 | C | — | — | Cobalt naphthenate | 720 (calculated as Co metal) | Zinc phosphatized steel sheet | 140 | 20 | 160 |
|  |  |  |  |  |  |  |  | 19 | 180 |
|  |  |  |  |  |  |  |  | 20 | 200 |
| 3 | C | — | — | Cobalt salicylaldehyde complex | 720 (calculated as Co metal) | Zinc phosphatized steel sheet | 140 | 18 | 160 |
|  |  |  |  |  |  |  |  | 20 | 180 |
|  |  |  |  |  |  |  |  | 19 | 200 |
| 4 | C | Hydroquinone monomethyl ether | 0.5 | Cobalt salicylaldehyde complex | 720 (calculated as Co metal) | Zinc phosphatized steel sheet | 140 | 19 | 160 |
|  |  |  |  |  |  |  |  | 21 | 180 |
|  |  |  |  |  |  |  |  | 18 | 200 |

| Example No. | Hardness[1] | Deep-drawing value[2] | Acetone Resistance[3] | Surface[4] | Corrosion Resistance[5] |
|---|---|---|---|---|---|
| Comparative Example C1 | 70 | 0.6 | 4 | 1 | >20 |
|  | 130 | 1.8 | 3 | 1 | >20 |
|  | 152 | 3.2 | 1 | 1 | 3 |
| Comparative Example C2 | 156 | 5.6 | 1 | 2 | 3–5 |
|  | 153 | 7.8 | 0 | 3 | 2 |
|  | 151 | 7.9 | 0 | 3 | 1–2 |
| 3 | 159 | 7.9 | 0 | 1 | 3–6 |
|  | 156 | 8.1 | 0 | 1 | 1–2 |
|  | 154 | 8.0 | 0 | 1 | 1–2 |
| 4 | 160 | 8.1 | 0 | 0 | 3–4 |
|  | 157 | 7.9 | 0 | 0 | 1–2 |
|  | 159 | 8.2 | 0 | 0 | 1–2 |

We claim:

1. An aqueous cationic surface-coating system containing an olefinically unsaturated surface-coating binder having basic nitrogen groups, which binder contains $\alpha,\beta$-olefinically unsaturated amidomethyl groups or $\alpha,\beta$-olefinically unsaturated carboxylic acid ester groups or products derived from a diene polymer or a mixture of these products wherein some or all of the basic nitrogen groups are converted into salts with acid, which surface-coating system contains from 1 ppm to 1% by weight (metal content, based on the binder) of a Co, Mn, Pb, Ce, Zr, Ca, Zn, Fe, Al, Cu, Ni or Cd complex, if appropriate in combination with an inhibitor or an initiator which supplies free radicals or with a mixture of an inhibitor and an initiator which supplies free radicals.

2. An aqueous cationic surface-coating system as claimed in claim 1, wherein an intiator which supplies free radicals, or splits off oxygen, at above 100° C. is used.

3. A process for cathodic electrocoating of metal surfaces, wherein an aqueous cationic surface-coating system as claimed in claim 1 is applied to the surface to be coated.

4. A process for surface-coating substrates which comprises: spraying, dipping or flow-coating the surface with an aqueous cationic surface-coating system as claimed in claim 1.

* * * * *